(12) United States Patent
Song et al.

(10) Patent No.: US 9,075,575 B2
(45) Date of Patent: Jul. 7, 2015

(54) MULTIMEDIA DEVICE HAVING DETACHABLE CONTROLLER FUNCTIONING AS REMOTE CONTROL WHILE DETACHED

(75) Inventors: Byung-youn Song, Suwon-si (KR); Nag-eui Choi, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 206 days.

(21) Appl. No.: 13/610,405

(22) Filed: Sep. 11, 2012

(65) Prior Publication Data
US 2013/0088333 A1   Apr. 11, 2013

(30) Foreign Application Priority Data
Oct. 6, 2011  (KR) .......................... 10-2011-0101837

(51) Int. Cl.
| G08B 21/00 | (2006.01) |
| G06F 1/16 | (2006.01) |
| G06F 3/041 | (2006.01) |
| H04N 21/418 | (2011.01) |
| H04N 21/422 | (2011.01) |
| H04N 21/442 | (2011.01) |
| H04N 21/443 | (2011.01) |

(52) U.S. Cl.
CPC ............ *G06F 1/1656* (2013.01); *G06F 1/1632* (2013.01); *G06F 3/041* (2013.01); *G06F 2200/1637* (2013.01); *H04N 21/418* (2013.01); *H04N 21/42208* (2013.01); *H04N 21/42219* (2013.01); *H04N 21/42224* (2013.01); *H04N 21/44231* (2013.01); *H04N 21/4424* (2013.01); *H04N 21/4438* (2013.01)

(58) Field of Classification Search
CPC ........... H04N 5/4403; H04N 21/42224; G06F 3/04883
USPC ......... 340/4.11, 12.3; 345/156, 157; 341/176; 348/347
See application file for complete search history.

(56) References Cited

U.S. PATENT DOCUMENTS

| 2004/0125080 | A1* | 7/2004 | Ha et al. ........................ 345/156 |
| 2006/0267726 | A1* | 11/2006 | Arai et al. ..................... 340/3.71 |
| 2007/0232098 | A1* | 10/2007 | Danner ......................... 439/131 |
| 2008/0088602 | A1* | 4/2008 | Hotelling ...................... 345/173 |
| 2008/0316371 | A1* | 12/2008 | Hauck .......................... 348/734 |
| 2010/0007518 | A1* | 1/2010 | Kang et al. ................ 340/825.72 |
| 2010/0277337 | A1 | 11/2010 | Brodersen et al. |

FOREIGN PATENT DOCUMENTS

| JP | 05-227578 | 9/1993 |
| KR | 10-2004-0107053 | 12/2004 |
| KR | 10-2006-0026228 | 3/2006 |
| KR | 10-0608576 | 8/2006 |
| KR | 10-2010-0024589 | 3/2010 |
| KR | 10-2011-0004183 | 1/2011 |

OTHER PUBLICATIONS

Korean Office Action issued Oct. 25, 2012 in counterpart Korean Patent Application No. 10-2011-0101837 (4 pages, in Korean).

* cited by examiner

*Primary Examiner* — Mark Rushing
(74) *Attorney, Agent, or Firm* — NSIP Law

(57) ABSTRACT

Provided is a multimedia device that has a detachable controller. The detachable controller may attach to a main body of a multimedia device and act as a control panel of the main body. Further, the controller may be detached from the main body of multimedia device and act as a remote controller of the multimedia device.

18 Claims, 9 Drawing Sheets

MULTIMEDIA DEVICE HAVING DETACHABLE CONTROLLER FUNCTIONING AS REMOTE CONTROL WHILE DETACHED

CROSS-REFERENCE TO RELATED APPLICATION(S)

This application claims the benefit under 35 USC §119(a) of Korean Patent Application No. 10-2011-0101837, filed on Oct. 6, 2011, in the Korean Intellectual Property Office, the entire disclosure of which is incorporated herein by reference for all purposes.

BACKGROUND

1. Field

The following description relates to a multimedia device, and more particularly, to a multimedia device that has a detachable controller.

2. Description of Related Art

Recently, smart functions such as the Internet, video games, Social Network Services (SNS), and the like, have been installed in multimedia devices, such as Blu-ray players, multimedia players, set-top boxes, and game consoles. By installing smart functions in multimedia devices, function keys of a control panel of the multimedia device, which are used to operate the smart functions, have become increasingly complicated.

Multimedia devices typically include a remote control that is able to remotely control the device at a near distance for convenience in the use thereof. A remote control controls a multimedia device using various methods, such as Infrared rays and electronic waves. Operation keys of remote controls are also complicated with complicated functions of multimedia devices, thereby increasing the need for user convenience for such remote controls.

SUMMARY

In an aspect, there is provided a multimedia device including a main body configured to process input data and to output multimedia data, and a controller configured to control a function of the main body, wherein the main body and the controller each comprise one or more joints for attaching and detaching the controller to and from the main body, and the controller is configured to function as a control panel of the main body while attached to the main body and to function as a remote control of the main body while detached from the main body.

Each of the joints may comprise magnets for attaching the main body and the controller to each other by a magnetic force therebetween.

At least one of the main body and the controller may comprise a first sensor unit configured to detect an attached and detached state of the controller, and the controller may comprise an input unit configured to display at least two user interface modes, and a controlling unit configured to change a user interface mode of the input unit according to the attached or detached state of the controller detected by the first sensor unit.

The input unit may comprise a touch screen panel, the controlling unit may be configured to display a first user interface input window on the touch screen panel in response to the first sensor unit detecting that the controller is attached to the main body and to display a second user interface input window on the touch screen panel in response to the first sensor unit detecting that the controller is detached from the main body, and the first user interface input window and the second user interface input window are different from each other.

The controller may further comprise a second sensor unit configured to detect how a user is holding the controller, and the controlling unit may be configured to change a user interface mode of the input unit based on how the user is holding the controller.

The input unit may comprise a touch screen panel, the controlling unit may be configured to display a third user interface input window on the touch screen panel in response to the second sensor unit detecting that the user is holding the controller with both hands and to display a fourth user interface input window on the touch screen panel in response to the second sensor unit detecting that the user is holding the controller with one hand, and the third user interface input window and the fourth user interface input window are different from each other.

The controller may further comprise a third sensor unit configured to detect a direction of the controller, and the controlling unit may be configured to change a user interface mode of the input unit based on the direction of the controller.

The main body and the controller may comprise a first connector and a second connector, respectively, for electrically connecting to each other while the controller is attached to the main body.

A control signal of the controller may be transmitted through the first connector and the second connector while the controller is attached to the main body.

The controller may be charged through the first connector and the second connector while the controller is attached to the main body.

In an aspect, there is provided a method of controlling a multimedia device having a detachable controller that attaches to at least a portion of a front surface of a main body, the method including functioning as a control panel of the main body of the multimedia device while the controller is attached to the main body, and functioning as a remote control of the main body of the multimedia device while the controller is detached from the main body.

The method may further comprise detecting an attached or detached state of the controller to or from the main body, and changing a user interface mode of the controller based on the attached or detached state of the controller.

The controller may comprise a touch screen panel, and the changing of a user interface mode of the controller may comprise changing a user interface input window on the touch screen panel.

The method may further comprise detecting how a user is holding the controller while the controller is detached from the main body, and changing a user interface mode of the controller based on how the user is holding the controller.

The method may further comprise detecting a direction of the controller, and changing a user interface mode of the controller based on the detected direction of the controller.

The controller may transmit a control signal to the main body through a direct electrical contact while the controller is attached to the main body.

In an aspect, there is provided a controller for a multimedia device which is detachable from a main body of the multimedia device, wherein the controller is configured to function as a control panel of the main body while attached to the main body, and function as a remote control of the main body while detached from the main body.

The controller may comprise an input unit configured to display at least two user interface modes, a first sensor unit configured to detect an attached and detached state of the controller, and a controlling unit configured to change a user interface mode of the input unit based on the attached or detached state of the controller detected by the first sensor unit.

The input unit may comprise a touch screen panel, the controlling unit may be configured to display a first user interface input window on the touch screen panel in response to the first sensor unit detecting that the controller is attached to the main body and display a second user interface input window on the touch screen panel in response to the first sensor unit detecting that the controller is detached from the main body, and the first user interface input window and the second user interface input window are different from each other.

The controller may further comprise a second sensor unit configured to detect how a user is holding the controller, wherein the controlling unit is configured to change a user interface mode of the input unit based on how the user is holding the controller.

Other features and aspects may be apparent from the following detailed description, the drawings, and the claims.

Figure 1:
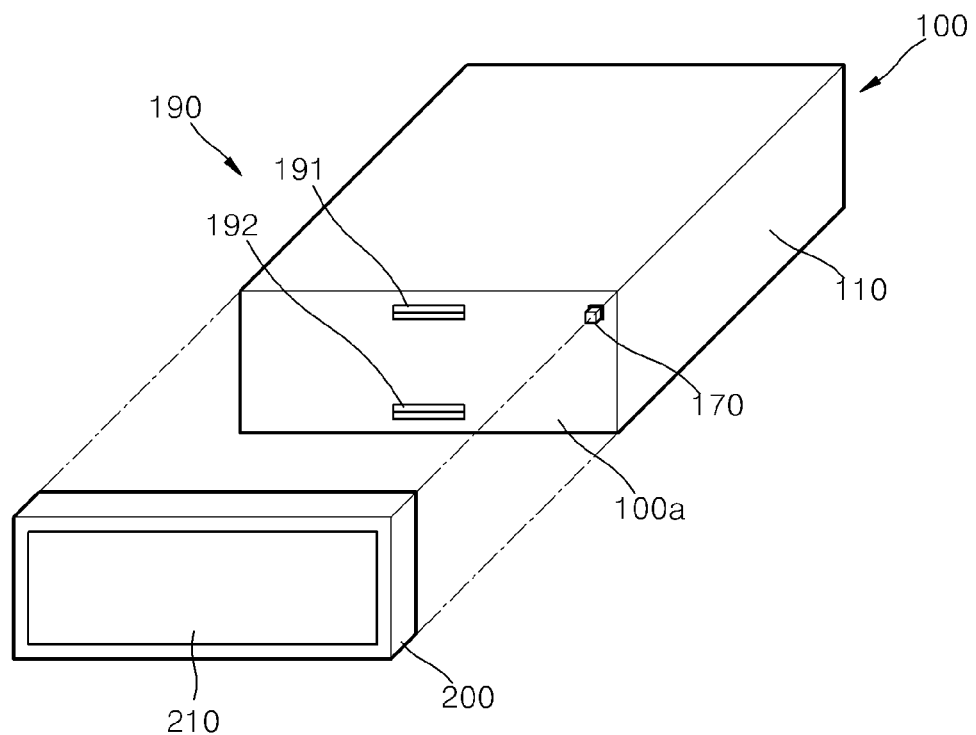
FIG. 1 is a diagram illustrating an example of a multimedia device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
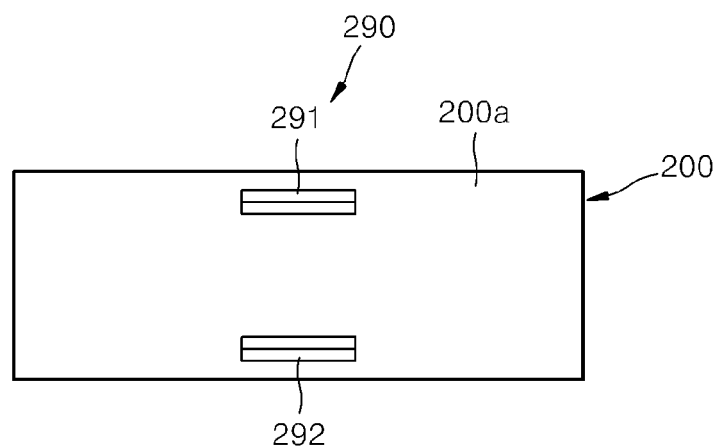
FIG. 2 is a diagram illustrating an example of a front view of a rear surface (attached surface) of a controller of the multimedia device of FIG. 1.
Figure 3:
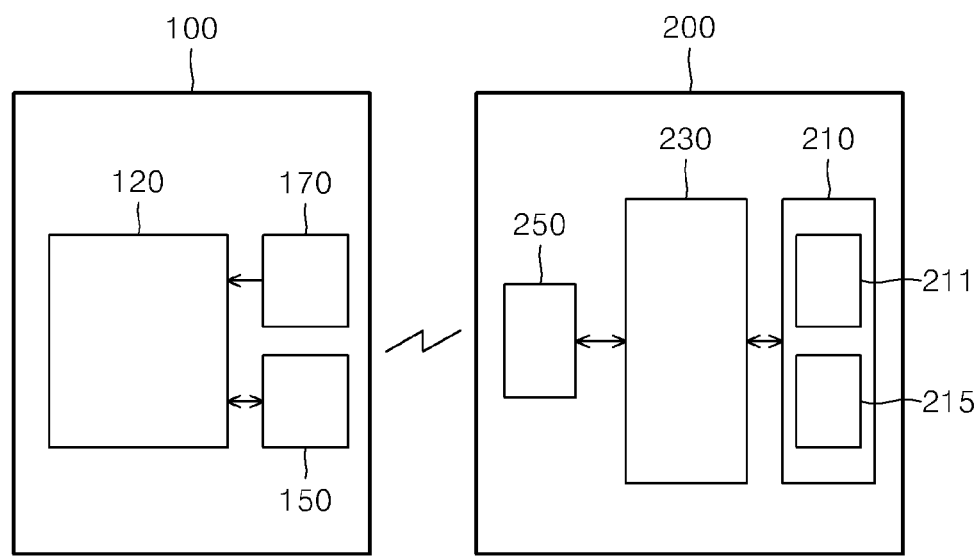
FIG. 3 is a block diagram illustrating an example of the multimedia device of FIG. 1

FIG. 1 illustrates an example of a multimedia device, FIG. 2 illustrates an example of a rear surface (attached surface) of a controller 200 in the multimedia device of FIG. 1, and FIG. 3 illustrates an example of a block diagram of the multimedia device of FIG. 1.

Referring to FIGS. 1 to 3, the multimedia device includes a main body 100 for processing input data and outputting multimedia and the controller 200 for controlling a function of the multimedia device.

For example, the main body 100 of the multimedia device may be a digital device, such as a Blu-ray player, a multimedia player, a set-top box, a game console, a smart device in which a smart function, such as the Internet, a game or a Social Network Service (SNS), is installed, and the like. The main body 100 includes a signal processor 120 for processing input data and a first communication unit 150 for transmitting and receiving control state information and a control signal to and from the controller 200, which are accommodated in a housing 110. A multimedia signal processed by the signal processor 120 may be output to a display device (not shown) and/or a speaker system (not shown) through an output terminal (not shown). In this example, the display device or the speaker system may also be included in the housing 110. The housing 110 may have, for example, a rectangular parallelepiped shape as shown in FIG. 1.

The main body 100 includes a first sensor unit 170 for detecting an attached or detached state of the controller 200 and a first joint 190 for attaching or detaching the controller 200 to or from the main body 100. In this example, the first sensor unit 170 and the first joint 190 are disposed on a front surface 100a of the main body 100. The first sensor unit 170 may be, for example, a switch, an approximate sensor, and the like, which is pressed when the controller 200 is attached to the front surface 100a of the main body 100. Although the first sensor unit 170 is included in the main body 100 in the current example, the first sensor unit 170 may be disposed on a rear surface 200a (i.e., an attached surface) of the controller 200.

The controller 200 may control a function of the multimedia device while attached to or detached from the front surface 100a of the main body 100. For example, the controller 200 may function as a control panel of the main body 100 while attached to the main body 100 and may function as a remote control of the main body 100 while detached from the main body 100.

The controller 200 may have, for example, a rectangular parallelepiped shape that is long in one direction as shown in FIG. 1. As described herein, in various examples the main body 100 may have a rectangular parallelepiped shape as well, as shown in FIG. 1, and the controller 200 may be attached to the whole front surface 100a of the main body 100. Accordingly, while attached, they both may form one body having a rectangular parallelepiped shape.

The controller 200 includes an input unit 210 for receiving an input from a user, a controlling unit 230 for converting a signal input from the input unit 210 to a control signal, and a second communication unit 250 for transmitting and receiving control state information and a control signal to and from the first communication unit 150 of the main body 100. The controller 200 also includes a second joint 290 for attaching or detaching the controller 200 to or from the main body 100 which is disposed on the rear surface 200a of the controller 200. The rear surface 200a of the controller 200 is configured to face the front surface 100a of the main body 100 while the controller 200 is attached to the main body 100.

In the example of FIG. 1, the controller is configured to attach to the main body of the multimedia device. In some aspects, the controller may be a universal type controller or a controller capable of attaching to a plurality of different types of multimedia devices. Accordingly, a user may detach the controller from a main body of a first multimedia device and attach the controller to a main body of a second multimedia device. As a result, the controller may be used to control both the first and second multimedia devices.

For example, input unit 210 may be a touch screen panel including a display layer 211 and a touch input layer 215. The display layer 211 may display a user interface input window, which may change the display of the user interface input window based on whether the controller 200 is attached to or detached from the main body 100. The display layer 211 may also display a control state of the main body 100. The touch input layer 215 generates an electrical signal by sensing a touch of the user.

The controlling unit 230 may change a user interface mode of the input unit 210 based on whether the controller 200 is attached to or detached from the main body 100. The controlling unit 230 may convert a signal corresponding to a user operation, which is input from the input unit 210, to a control signal and transmit the control signal to the second communication unit 250. The controlling unit may also transmit control state information of the main body 100, which is received through the second communication unit 250, to the input unit 210.

The second communication unit 250 is a module for wirelessly transmitting and receiving control state information and a control signal to and from the first communication unit 150. For example, the first communication unit 150 and the second communication unit 250 may communicate via an Infrared communication method, an electronic wave communication method, an optical communication method, and the like. As an example, the communication units may communicate using a frequency of 2.4 GHz, Bluetooth, and the like.

The second joint 290 is detachably jointed to the first joint 190. For example, the first joint 190 and the second joint 290 may include magnets for attaching to each other by a magnetic force. As another example, the first joint 190 and the second joint 290 may include a protrusion and a recess into which the protrusion is inserted. As another example, the first joint 190 and the second joint 290 may include a hook and a hollow into which the hook is jointed.

In the example of FIG. 2, the first joint 190 includes two first joints 191 and 192. Likewise, second joint 290 includes two second joints 291 and 291 which correspond to the two first joints 191 and 192. However, the multimedia device is not limited to the number, size, and location of joints that are used to connect the controller 200 and the main body 100. For example, the main body 100 and the controller 200 may each include a single joint, or may each include two or more joints located at any desired position on the front surface 100a and the rear surface 200a, respectively.

Figure 4:
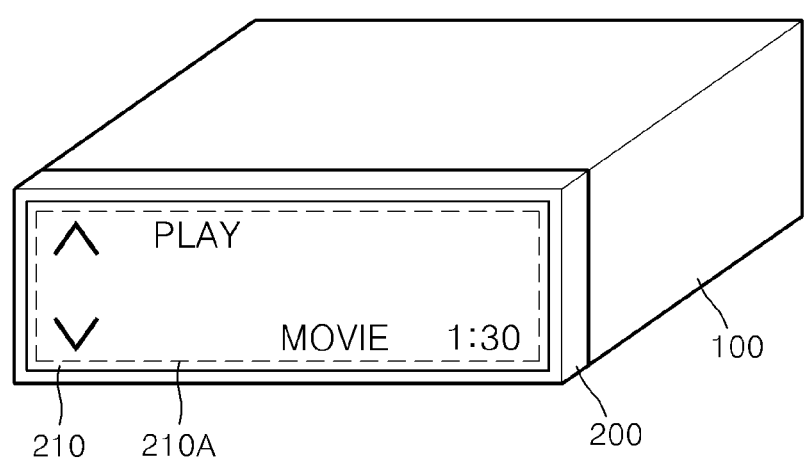
FIG. 4 is a diagram illustrating an example of a user interface in which the controller in the multimedia device of FIG. 1 functions as a front control panel.

FIG. 4 illustrates an example in which the controller 200 is attached to the main body 100.

Referring to FIG. 4, when the controller 200 is attached to the main body 100 of the multimedia device, the first sensor unit 170 may detect attachment of the controller 200 to the main body 100 and transmit information about the attachment to the signal processor 120. For example, the information regarding the attachment may be an on or off signal of the first sensor unit 170. The information about the attachment of the controller 200 to the main body 100 may be transmitted to the second communication unit 250 via the signal processor 120 and the first communication unit 150.

The controlling unit 230 may change a user interface mode of the input unit 210 to a first user interface mode in response to detecting the attachment of the controller 200 to the main body 100, which is received through the second communication unit 250. As another example, if the user interface mode of the input unit 210 is already the first user interface mode, the first user interface mode may be maintained as it is.

For example, if the input unit 210 is changed to the first user interface mode, the display layer 211 of the input unit 210 may display a first user interface input window 210A that is optimized to a front control panel style of the multimedia device. For example, as shown in FIG. 4, the first user interface input window 210A may be a graphic user interface that displays information about currently playing content, an operation key, a volume key, and the like. Although an operational environment of the graphic user interface of the input unit 210 may be provided by the controlling unit 230 of the controller 200, as another example, it may be provided by the signal processor 120 of the main body 100.

The controlling unit 230 may generate a control signal corresponding to a touch of the user by matching a coordinate value signal generated by the touch input layer 215 caused by the touch of the user with a key arrangement on the first user interface input window 210A displayed on the display layer 211. The second communication unit 250 may transmit the control signal generated by the controlling unit 230 to the main body 100 so that the main body 100 is controlled based on the control signal generated by the controlling unit 230.

Figure 5:
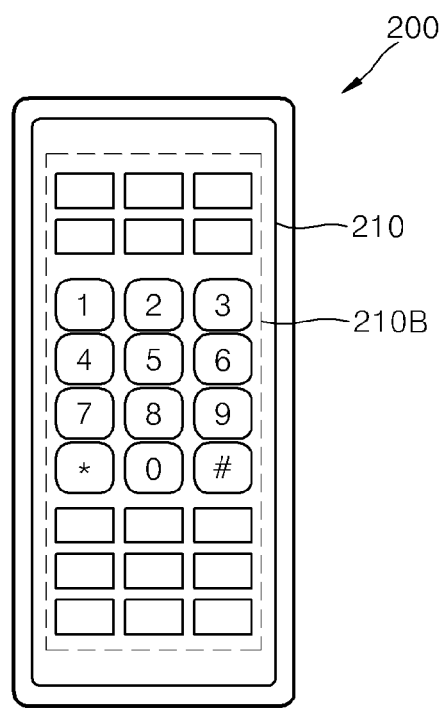
FIG. 5 is a diagram illustrating an example of a user interface in which the controller in the multimedia device of FIG. 1 functions as a remote control.

FIG. 5 illustrates an example in which the controller 200 is detached from the main body 100.

Referring to FIG. 5, when the controller 200 is detached from the main body 100 of the multimedia device, the first sensor unit 170 may detect the detachment of the controller 200 from the main body 100 and transmit information about the detachment of the controller 200 from the main body 100 to the signal processor 120. The information about the detachment of the controller 200 from the main body 100 may be transmitted to the second communication unit 250 via the signal processor 120 and the first communication unit 150.

The controlling unit 230 may change the user interface mode of the input unit 210 to a second user interface mode based on the information about the detachment of the controller 200 from the main body 100, which is received through the second communication unit 250. As another example, if the user interface mode of the input unit 210 is already the second user interface mode, the second user interface mode may be maintained as it is.

In response to the input unit 210 being changed to the second user interface mode, the display layer 211 of the input unit 210 may display a second user interface input window 210B that is optimized to a remote control style. For example, as shown in FIG. 5, the second user interface input window 210B may have an input key form of a standard remote control.

The controlling unit 230 may generate a control signal corresponding to a touch of the user by matching a coordinate value signal generated by the touch input layer 215 caused by the touch of the user with a key arrangement on the second user interface input window 210B displayed on the display layer 211.

The second communication unit 250 may transmit the control signal generated by the controlling unit 230 to the main body 100 so that the main body 100 is controlled based on the control signal generated by the controlling unit 230. As described herein, the controller 200 can perform both a front control panel function of the main body 100 and a remote control function. Accordingly, the number of parts of the multimedia device can be reduced, thereby reducing manufacturing costs of the multimedia device. Furthermore, by changing a user interface based on an attached or detached state of the controller 200, user convenience can be improved.

Although the housing 110 of the main body 100 has a rectangular parallelepiped shape, the housing 110 of the main body 100 is not limited thereto. As another example, the housing 110 of the main body 100 may have a shape of an upright rectangular parallelepiped or other various shapes, and it should be appreciated that the housing 110 is not limited to any particular shape.

In addition, although the controller 200 has a shape of a rectangular parallelepiped that is long in one direction in the current example, the controller 200 is not limited thereto. As another example, the rear surface 200a of the controller 200 may have curvature to increase a sense of gripping by the user. In this example, the front surface 100a of the main body 100 may have a complementary shape to engage with the curved shape of the rear surface 200a of the controller 200. As another example, a front surface of the controller 200 may have various shapes, such as a circular shape, an oval shape, and the like.

In addition, although the controller 200 is attached to the front surface 100a of the main body 100 of the multimedia device, the multimedia device is not limited to such an attachment. As another example, the controller 200 may be attached to a portion of the front surface 100a of the main body 100. As another example, the controller 200 may be attached to an upper or side surface of the main body 100. In an example in which the controller 200 is attached to the upper surface or side surface of the main body 100, the input unit 210 of the controller 200 may protrude from its attached location of the main body 100 to be exposed towards the front surface 100a of the main body 100.

Although a touch screen panel via which inputting and displaying are performed with one unit is described as the input unit 210 of the controller 200, the controller 200 is not limited thereto. As another example, the input unit 210 may be a touch sensor or a mechanical keyboard, and the controller 200 may include a separate display unit, such as a Light-Emitting Diode (LED) display, may be prepared. Furthermore, the input unit 210 may include a separate operation key (e.g., a power key) in addition to the touch screen panel.

Figure 6:
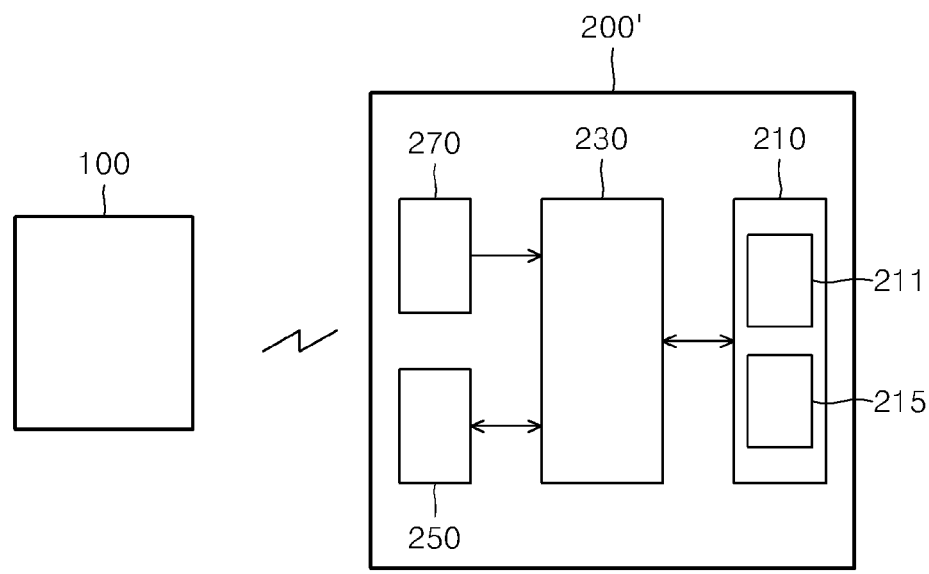
FIG. 6 is a block diagram illustrating another example of a multimedia device.
Figure 7:
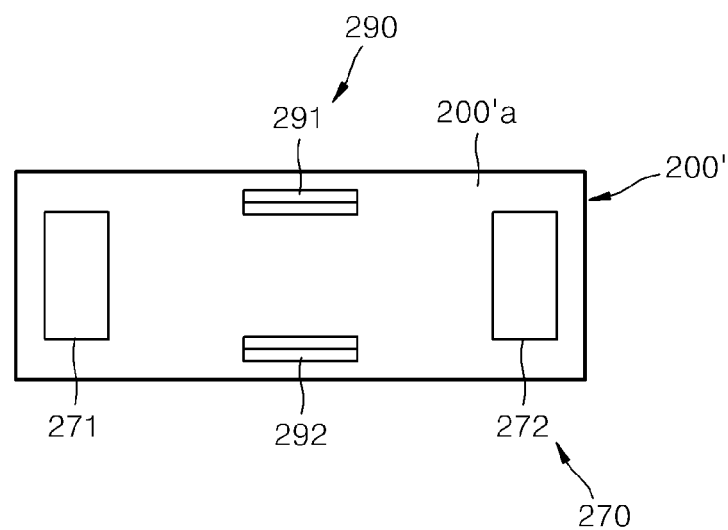
FIG. 7 is a diagram illustrating an example of a front view of a rear surface (attached surface) of a controller of the multimedia device of FIG. 6.

FIG. 6 illustrates an example of a block diagram of a multimedia device, and FIG. 7 illustrates an example of a front view of a rear surface 200a' (attached surface) of a controller 200' of the multimedia device of FIG. 6.

Referring to FIGS. 6 and 7, the multimedia device includes the main body 100 and the controller 200'. In this example, the main body 100 is substantially the same as the main body 100 described with reference to FIGS. 1 to 5. The controller 200' is substantially the same as the controller 200 described with reference to FIGS. 1 to 5 except that the controller 200' further includes a second sensor unit 270 for detecting the manner in which a user is holding the controller 200.

The second sensor unit 270 detects the manner in which a user of the controller 200' is holding the controller 200' while the controller 200' is detached from the main body 100 and is used as a remote control. For example, the second sensor unit 270 may include first and second sensors 271 and 272 that are disposed around both sides of the controller 200' to determine whether the user is holding the controller 200' with both hands or with one hand. For example, the first sensor 271 may be disposed on one side on the rear surface 200'a of the controller 200', and the second sensor 272 may be disposed on the other side on the rear surface 200'a of the controller 200'.

The first and second sensors 271 and 272 may include various sensors, such as a touch sensor for detecting a touch of a user, an approximate sensor for detecting an approach of a user's hand, a pressure sensor for detecting a pressure generated when a user's hand holds the controller 200', and the like. For example, the first and second sensors 271 and 272 may be a touch sensors, such as an electrostatic touch sensor, an electrostatic capacitive touch sensor, a resistive film touch sensor, an infrared touch sensor, and the like.

A touch of the user may be detected through a magnitude or variation of impedance, such as resistance, capacitance, and reactance of the first and second sensors 271 and 272. For example, an impedance value when the user holds the controller 200' with both hands may be different from an impedance value when the user holds the controller 200' with one hand. Accordingly, whether the user holds the controller 200' with both hands may be determined based on a detected magnitude of impedance. As another example, if a variation of impedance is detected by both the first and second sensors 271 and 272, it may be determined that the user holds the controller 200' with both hands, and if a variation of impedance is detected by only one of the first and second sensors 271 and 272, it may be determined that the user holds the controller 200' with one hand.

The controlling unit 230 controls an environment of a user interface of the input unit 210 based on a signal detected by the second sensor unit 270.

Figure 8:
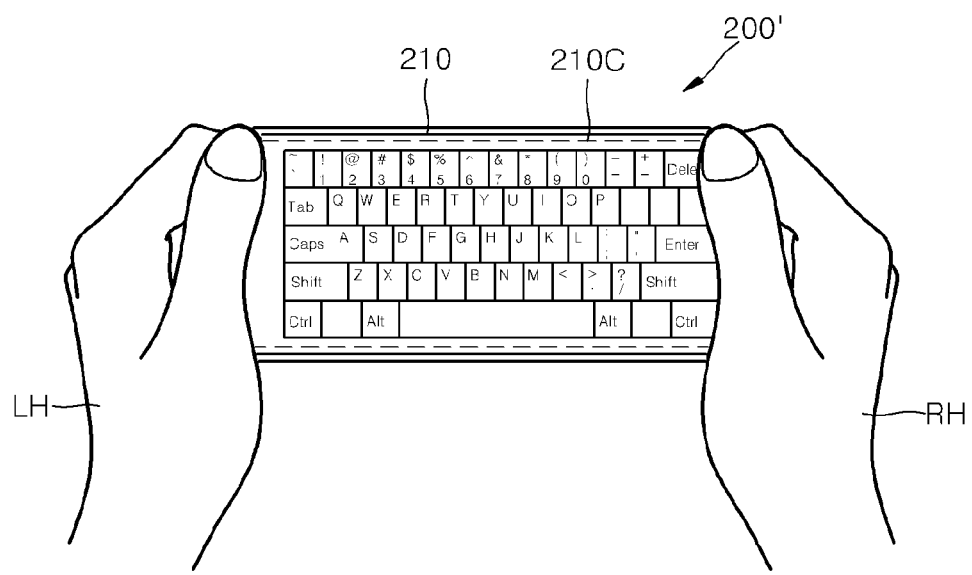
FIG. 8 is a diagram illustrating an example of a user interface while a user holds the controller with both hands.

Referring to FIG. 8, if a user holds both sides of the controller with the left and right hands LH and RH and presses the input unit 210 with the thumbs, the left hand LH of the user contacts the first sensor 271 of the second sensor unit 270, and the right hand RH of the user contacts the second sensor 272 of the second sensor unit 270. In this example, the first and second sensors 271 and 272 detect the contact of both the left and right hands LH and RH of the user. Accordingly, the controller 230 controls a user interface environment of the input unit 210 to be a third user interface mode suitable for a both-hands input. As another example, if only one of the first and second sensors 271 and 272 detects a contact by the user, the controller 230 may control the user interface environment of the input unit 210 to be a fourth user interface mode suitable for a one-hand input.

Hereafter, a method of controlling the multimedia device is described. When the controller 200' is detached from the main body 100, the first sensor unit 170 (referring to FIG. 3) detects the detachment of the controller 200' from the main body 100, and information about the detachment of the controller 200' from the main body 100 is transmitted to the second communication unit 250 of the controller 200' via the signal processor 120 (referring to FIG. 3) and the first communication unit 150 (referring to FIG. 3).

Upon receiving the information about the detachment of the controller 200' from the main body 100 via the second communication unit 250, the controlling unit 230 may determine the way that the user of the controller 200' is holding the controller 200' based on a detection signal received from the second sensor unit 270.

If the detection signal received from the second sensor unit 270 indicates that the user is holding the controller 200' with both hands, the controlling unit 230 may change the user interface mode of the input unit 210 to the third user interface mode. If the user interface mode of the input unit 210 is already the third user interface mode, the third user interface mode may be maintained as it is.

If the input unit 210 is changed to the third user interface mode, the display layer 211 of the input unit 210 may display a third user interface input window 210C that is optimized to both-hands input style. For example, as shown in FIG. 8, the third user interface input window 210C may display a graphic user interface having a QWERTY keyboard layout that is used in Personal Computers (PCs).

If the detection signal received from the second sensor unit 270 indicates that the user is holding the controller 200' with one hand, the controlling unit 230 may change the user interface mode of the input unit 210 to the fourth user interface mode. If the user interface mode of the input unit 210 is already the fourth user interface mode, the fourth user interface mode is maintained as it is.

Figure 9:
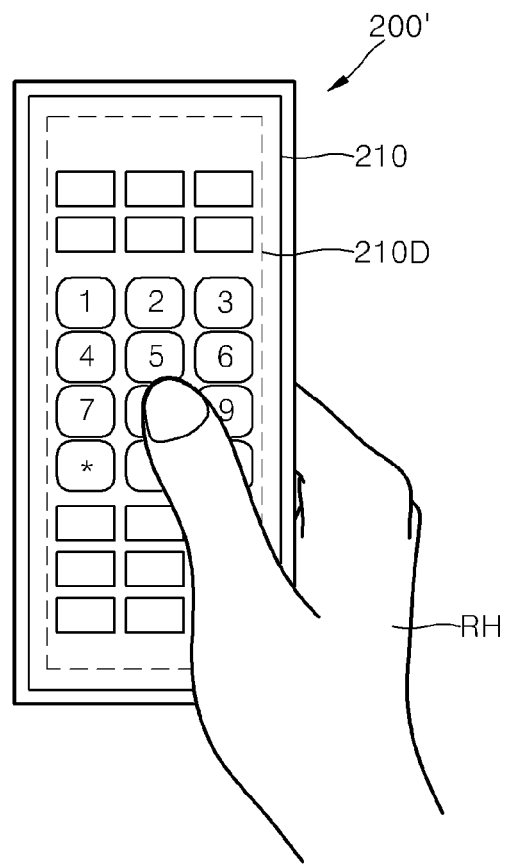
FIG. 9 is a diagram illustrating an example of a user interface while a user holds the controller with one hand.

If the input unit 210 is changed to the fourth user interface mode, the display layer 211 of the input unit 210 may display a fourth user interface input window 210D that is optimized to a one-hand input style. For example, as shown in FIG. 9, the fourth user interface input window 210D may display a graphic user interface having a keyboard layout in which number keys and function keys are combined, which is used in remote controls that are optimized to a one-hand input.

The controlling unit 230 may generate a control signal corresponding to a touch of the user by matching a coordinate value signal generated by the touch input layer 215 caused by the touch of the user with a key arrangement displayed on the display layer 211. The second communication unit 250 may transmit the control signal generated by the controlling unit 230 to the main body 100 so that the main body 100 is controlled based on the control signal generated by the controlling unit 230.

As described herein, the controller 200' is capable of performing both the front control panel function of the main body 100 and the remote control function. Further, a user interface of the controller 200' is determined based on the way a user is holding the controller 200' that is detached from the main body 100, thereby further increasing user convenience.

Figure 10:
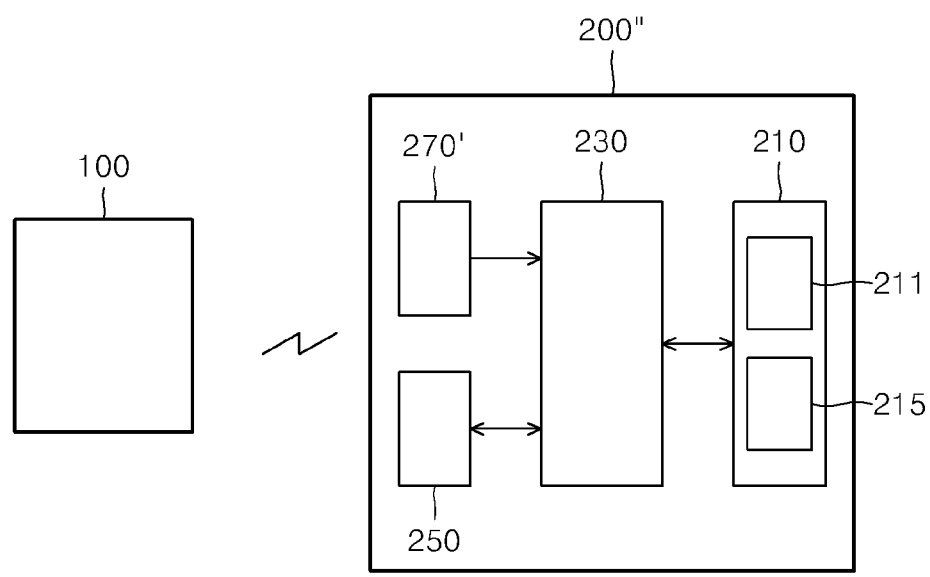
FIG. 10 is a block diagram illustrating another example of a multimedia device.

FIG. 10 illustrates an example of a block diagram of another multimedia device.

Referring to FIG. 10, the multimedia device includes a main body 100 and a controller 200" for controlling the main body 100. The main body 100 is substantially the same as the main body 100 described with reference to FIGS. 1 to 5. The controller 200" is substantially the same as the controller 200 described with reference to FIGS. 1 to 5 and the controller 200' described with reference to FIGS. 6 to 9 except the controller 200" further includes a third sensor unit 270' for detecting a direction of the controller 200".

The third sensor unit 270' may detect a direction or motion of the controller 200" while the controller 200" is detached from the main body 100. For example, the third sensor unit 270' may include at least one of an inertia sensor, a gravity sensor, a geomagnetism sensor, a gyroscope, and the like.

The direction or motion of the controller 200" which is detected by the third sensor unit 270', may be reflected to determine an environment of a user interface of the input unit 210 by detecting a the way the user is holding the controller 200". For example, the third sensor unit 270' may be an inertia sensor. Based on a position at which a front end of the controller 200" is towards the main body 100, a degree of the controller 200" deviating from the position may be detected. If the front end of the controller 200" deviates from the main body 100 by more than 45° in the left or right direction, it may be determined that a length direction of the controller 200" is towards both hands of the user. In this example, the input unit 210 may display the third user interface (refer to 210C of FIG. 8), such as the QWERTY keyboard layout.

The input unit 210 may further include an additional user interface to which information detected by the third sensor unit 270' is reflected in addition to the first through fourth user interfaces in the above-described examples. For example, the third sensor unit 270' may be a gravity sensor. If the length direction of the controller 200" is detected as a vertical direction or a horizontal direction, the first to fourth user interfaces in the above-described examples may be modified according to a vertical or horizontal state of the controller 200".

Figure 11:
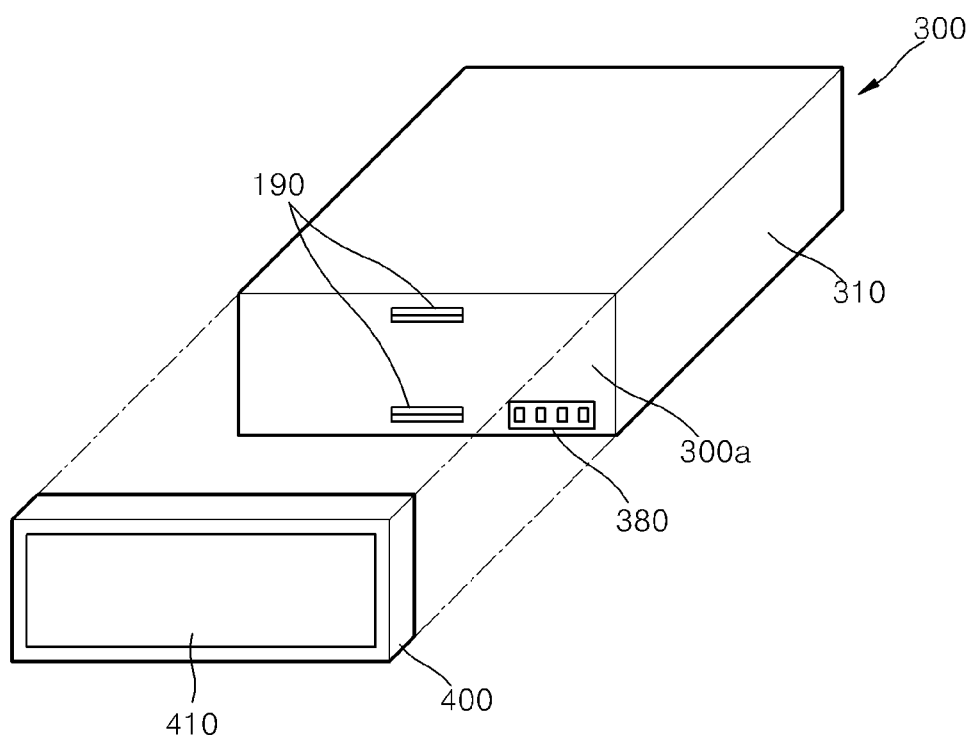
FIG. 11 is a diagram illustrating another example of a multimedia device.
Figure 12:
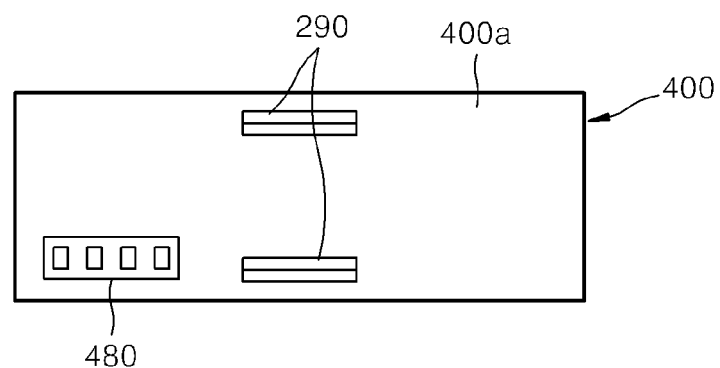
FIG. 12 is a diagram illustrating an example of a front view of a rear surface (attached surface) of a controller in the multimedia device of FIG. 11.
Figure 13:
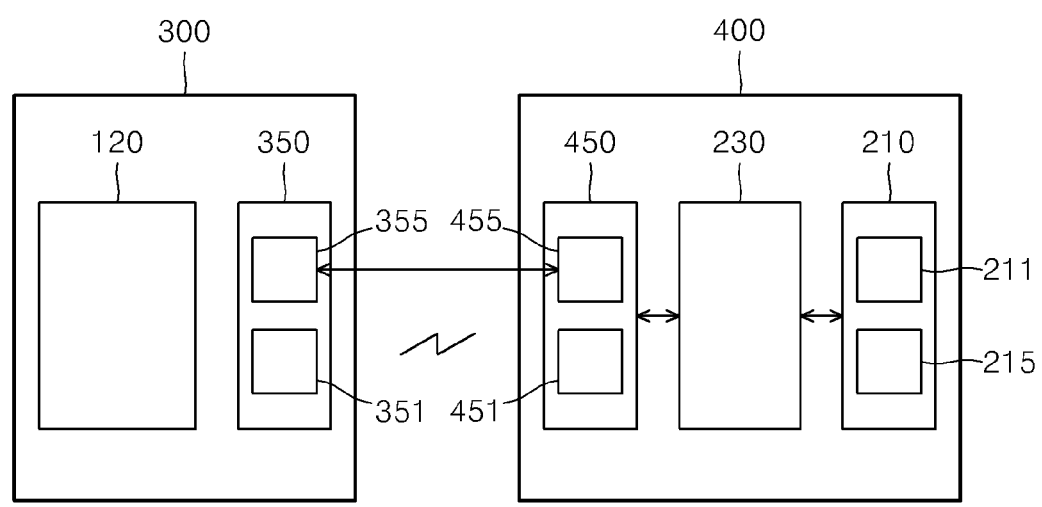
FIG. 13 is a block diagram illustrating an example of the multimedia device of FIG. 11.

FIG. 11 illustrates another example of a multimedia device, FIG. 12 illustrates an example of a front view of a rear surface 400a (attached surface) of a controller 400 in the multimedia device of FIG. 11, and FIG. 13 illustrates an example of a block diagram of the multimedia device of FIG. 11.

Referring to FIGS. 11 to 13, the multimedia device includes a main body 300 and the controller 400 for controlling the multimedia device. This example is the same as those shown with reference to FIGS. 1 to 10 except for a direct electrical connection structure.

Referring to the block diagram, the main body 300 includes the signal processor 120 and a first communication unit 350 for transmitting and receiving control state information and a control signal to and from the controller 400. The signal processor 120 and the first communication unit may be included in housing 310. The first communication unit 350 includes a first wireless communication unit 351 and a first wired communication unit 355.

The controller 400 includes the input unit 210 for receiving an input of a user, the controlling unit 230 for converting a signal input from the input unit 210 to a control signal, and a second communication unit 450 for transmitting and receiving control state information and a control signal to and from the first communication unit 350 of the main body 300 of the multimedia device. The second communication unit 450 includes a second wireless communication unit 451 and a second wired communication unit 455. The first and second wireless communication units 351 and 451 are substantially the same as the first and second communication units 150 and 250 described with reference to FIGS. 1 to 5, respectively.

A first connection terminal 380 and a second connection terminal 480 for an electrical connection are disposed on a front surface 300a of the main body 300 and the rear surface 400a of the controller 400, respectively. When the controller 400 is attached to the main body 300, the attachment of the controller 400 to the main body 300 may be detected by a direct electrical connection between the first and second connection terminals 380 and 480. In this example, the first and second connection terminals 380 and 480 may be the same as the first sensor unit 170 (refer to FIG. 1) in the embodiment described with reference to FIGS. 1 to 5. That is, the first and second wired communication units 355 and 455 may exchange information with each other by the direct electrical connection between the first and second connection terminals 380 and 480. Further, the controlling unit 230 of the controller 400 may control the input unit 210 to be in the first user interface mode (refer to FIG. 4) that is optimized to a front control panel style of the multimedia device.

When the controller 400 is attached to the main body 300, the first wired communication unit 355 of the main body 300 may transmit and receive information to and from the second wired communication unit 455 of the controller 400 in a wired manner via the first and second connection terminals 380 and 480. In this example, the first and second wireless communication units 351 and 451 stop operating, thereby reducing loads of the signal processor 120 and the controlling unit 230 and further reducing power consumption of the multimedia device. Furthermore, power may be provided to an internal battery (not shown) of the controller 400 via the first and second connection terminals 380 and 480. Accordingly, the internal battery of the controller 400 may be charged while the controller 400 is attached to the main body 300.

According to various aspects, provided is a detachable controller for a multimedia device that performs functions of a control panel and a remote control of a main body. Accordingly, manufacturing costs of the multimedia device may be reduced. Furthermore, a user interface may be changed according to an attached or detached state of the controller or based on the way a user is holding the controller, thereby increasing user convenience of the multimedia device. As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multimedia device comprising:
    a main body configured to process input data and to output multimedia data;
    a controller configured to control a function of the main body; and
    a controlling unit configured to change a user interface mode based on how a user is holding the controller, wherein
       the main body and the controller each comprise a joint configured to attach and detach the controller to and from the main body, and the controller is configured to function as a control panel of the main body while attached to the main body and to function as a remote control of the main body while detached from the main body,
    the controller further comprises a first sensor unit and a second sensor unit configured to detect how a user is holding the controller,
    the controlling unit is configured to display a first user interface input window or a second user interface input window in response to a signal by the first sensor unit, and a third user interface input window in response to the second sensor unit detecting that the user is holding the controller with both hands and to display a fourth user interface input window in response to the second sensor unit detecting that the user is holding the controller with one hand, and
    the third user interface input window and the fourth user interface input window are different from each other.

2. The multimedia device of claim 1, wherein each of the joints comprises magnets that attach the main body and the controller to each other.

3. The multimedia device of claim 1, wherein one of the main body and the controller comprises a first sensor unit configured to detect an attached and detached state of the controller, and
    the controller comprises:
       an input unit configured to display two user interface modes; and
       a controlling unit configured to change a user interface mode of the input unit based on the attached or detached state of the controller detected by the first sensor unit.

4. The multimedia device of claim 3, wherein the input unit comprises a touch screen panel,
    the controlling unit is configured to display a first user interface input window on the touch screen panel in response to the first sensor unit detecting that the controller is attached to the main body and to display a second user interface input window on the touch screen panel in response to the first sensor unit detecting that the controller is detached from the main body, and
    the first user interface input window and the second user interface input window are different from each other.

5. The multimedia device of claim 1, wherein the controller further comprises a first sensor unit, a second sensor unit, and a third sensor unit configured to detect a direction of the controller, and
    the controlling unit is configured to change a user interface mode of the input unit based on the direction of the controller.

6. The multimedia device of claim 1, wherein the main body and the controller comprise a first connector and a second connector, respectively, electrically connecting to each other while the controller is attached to the main body.

7. The multimedia device of claim 6, wherein a control signal of the controller is transmitted through the first connector and the second connector while the controller is attached to the main body.

8. The multimedia device of claim 6, wherein the controller is charged through the first connector and the second connector while the controller is attached to the main body.

9. A method of controlling a multimedia device having a detachable controller that attaches to a portion of a front surface of a main body, the method comprising:
    functioning as a control panel of the main body of the multimedia device while the controller is attached to the main body;
    functioning as a remote control of the main body of the multimedia device while the controller is detached from the main body;
    detecting how a user is holding the controller with a first sensor unit and a second sensor unit; and
    changing a user interface mode based on how a user is holding the controller, by displaying a first user interface input window or a second user interface input window in response to a signal by the first sensor unit, displaying a third user interface input window in response to a second sensor unit detecting that the user is holding the controller with both hands, and displaying a fourth user interface input window in response to the second sensor unit detecting that the user is holding the controller with one hand, and wherein the third user interface input window and the fourth user interface input window are different from each other.

10. The method of claim 9, further comprising:

detecting an attached or detached state of the controller to or from the main body; and changing a user interface mode of the controller based on the attached or detached state of the controller.

11. The method of claim 10, wherein the controller comprises a touch screen panel, and the changing of a user interface mode of the controller comprises changing a user interface input window on the touch screen panel.

12. The method of claim 9, further comprising:

detecting how a user is holding the controller while the controller is detached from the main body; and changing a user interface mode of the controller based on how the user is holding the controller.

13. The method of claim 9, further comprising:

detecting a direction of the controller; and changing a user interface mode of the controller based on the detected direction of the controller.

14. The method of claim 9, wherein the controller transmits a control signal to the main body through a direct electrical contact while the controller is attached to the main body.

15. A controller for a multimedia device which is detachable from a main body of the multimedia device, comprising:

a controlling unit configured to change a user interface mode based on how a user is holding the controller;

a first sensor unit and a second sensor unit configured to detect how a user is holding the controller;

wherein the controller is configured to function as a control panel of the main body while attached to the main body, function as a remote control of the main body while detached from the main body, display a first user interface input window or a second user interface input window in response to a signal by the first sensor unit, and display a third user interface input window in response to a second sensor unit detecting that the user is holding the controller with both hands and display a forth user interface input window in response to the second sensor unit detecting that the user is holding the controller with one hand, and the third user interface input window and the fourth user interface input window are different from each other.

16. The controller of claim 15, wherein the controller comprises:

an input unit configured to display two user interface modes;

a first sensor unit configured to detect an attached and detached state of the controller; and a controlling unit configured to change a user interface mode of the input unit based on the attached or detached state of the controller detected by the first sensor unit.

17. The controller of claim 16, wherein the input unit comprises a touch screen panel, the controlling unit is configured to display a first user interface input window on the touch screen panel in response to the first sensor unit detecting that the controller is attached to the main body and display a second user interface input window on the touch screen panel in response to the first sensor unit detecting that the controller is detached from the main body, and the first user interface input window and the second user interface input window are different from each other.

18. The controller of claim 15, further comprising a second sensor unit configured to detect how a user is holding the controller, wherein the controlling unit is configured to change a user interface mode of the input unit based on how the user is holding the controller.

\* \* \* \* \*